United States Patent
Klusman et al.

(10) Patent No.: US 7,329,048 B2
(45) Date of Patent: Feb. 12, 2008

(54) SELF CONTAINED SQUEEZE FILM DAMPING SYSTEM

(75) Inventors: Steven Arlen Klusman, Indianapolis, IN (US); Mark Stephen Henry, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 106 days.

(21) Appl. No.: 11/184,682

(22) Filed: Jul. 19, 2005

(65) Prior Publication Data

US 2007/0086685 A1 Apr. 19, 2007

(51) Int. Cl.
*F16C 19/06* (2006.01)
(52) U.S. Cl. ...................................................... 384/99
(58) Field of Classification Search .................. 384/99, 384/490, 526, 548, 581
See application file for complete search history.

(56) References Cited

U.S. PATENT DOCUMENTS

| | | | |
|---|---|---|---|
| 3,722,212 A | 3/1973 | Stein | |
| 4,151,710 A | 5/1979 | Griffin et al. | |
| 4,285,632 A | 8/1981 | DeSalve | |
| 4,511,016 A | 4/1985 | Doell | |
| 4,683,714 A | 8/1987 | Thebert | |
| 4,759,401 A | 7/1988 | Pfouts et al. | |
| 4,775,248 A | 10/1988 | Barbic et al. | |
| 4,782,919 A | 11/1988 | Chalaire et al. | |
| 5,076,766 A | 12/1991 | Gutknecht | |
| 5,169,241 A | 12/1992 | Singh | |
| 5,207,511 A | 5/1993 | Bobo | |
| 5,320,134 A | 6/1994 | Singh | |
| 6,102,577 A | 8/2000 | Tremaine | |
| 6,626,574 B2 | 9/2003 | Bos et al. | |
| 6,695,478 B2 | 2/2004 | Bos et al. | |
| 2004/0003968 A1 | 1/2004 | Rakhmailov | |

*Primary Examiner*—Lenard A. Footland
(74) *Attorney, Agent, or Firm*—Krieg DeVault LLP

(57) ABSTRACT

A fluid damping system for damping a shaft within a gas turbine engine component. The fluid damping system including a damping liquid and a pressurized gas in a closed self contained system. In one aspect the damping liquid is cooled by being disposed in a heat transfer relationship with a fuel.

15 Claims, 4 Drawing Sheets

SELF CONTAINED SQUEEZE FILM DAMPING SYSTEM

This invention was made with U.S. Government support under contract number N902C1 awarded by the U.S. Navy, and the U.S. Government may have certain rights in the invention.

FIELD OF THE INVENTION

The present invention relates generally to squeeze film damping systems for damping a shaft. More specifically, in one form the present invention relates to a self contained squeeze film damping system including a damping liquid and a pressurized gas.

BACKGROUND OF THE INVENTION

Squeeze film damping systems are advantageously applied to turbomachinery including gas turbine engines in order to damp undesirable radial motion of a rotor shaft of the device. In a typical squeeze film damping system, it is known to locate a film of oil in a thin annular space between the outer race of a rolling element bearing and a structural component. Vibratory or radial motion of the rotor shaft and its bearing generate hydrodynamic forces in the oil within the thin annular space for damping purposes. Although, the present inventions were developed for application in gas turbine engines there is contemplated that these inventions may also be utilized in other areas of technology.

It is recognized that there are a significant number of prior squeeze film damping systems. However, there are still needed further technical developments in the area of squeeze film damping systems. The present inventions satisfy this and other needs in a novel and unobvious way.

SUMMARY OF THE INVENTION

One form of the present invention contemplates an apparatus comprising: a body having an inner surface; a rotatable shaft; a bearing coupled with the shaft and located within the body, the bearing having an outer surface spaced from the inner surface to define an annular space therebetween; and a reservoir in fluid communication with the annular space, the reservoir and the annular space forming at least a portion of a closed squeeze film damping system including a damping liquid and a pressurized gas, wherein at least a portion of the damping liquid is located within the annular space to damp the shaft.

Another form of the present invention contemplates an apparatus comprising: a gas turbine engine component including a housing; a bearing located inside the housing; a shaft coupled with the bearing and having a portion located within the housing; a fluid tight passageway including a liquid damping fluid and a pressurized gas therein, a portion of the fluid tight passageway disposed around the bearing and between the bearing and the housing and containing a quantity of the liquid damping fluid operable to damp the shaft; and a fuel system including a fuel passageway with a fuel therein, the fuel passageway disposed in a heat transfer relationship with the fluid tight passageway to cool the liquid damping fluid.

Yet another form of the present invention contemplates an apparatus, comprising: a housing having an inner surface; a bearing located inside the housing; a rotatable shaft having at least a portion located within the housing and coupled with the bearing; and a self contained damping system including a damping liquid and a pressurized gas therein, the damping system having a first portion disposed between the bearing and the inner surface and filled with the damping liquid to damp the shaft.

DESCRIPTION OF THE ILLUSTRATIVE EMBODIMENTS

Figure 1:
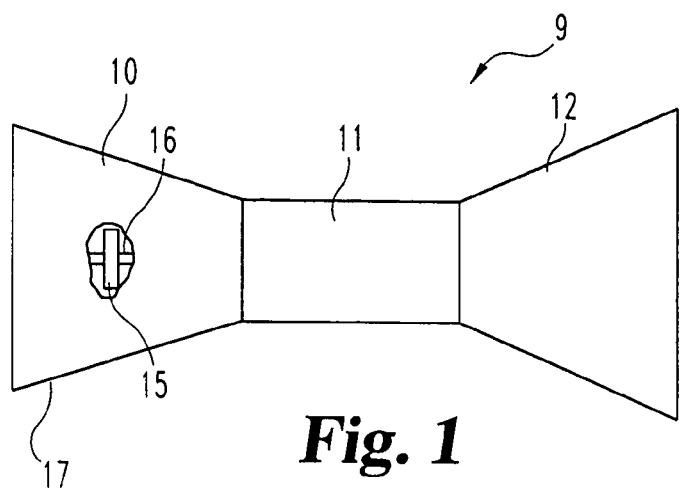
FIG. 1 is an illustrative block diagram of a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated a schematic representation of a gas turbine engine 9. This non limiting depiction of gas turbine engine 9 includes a compressor section 10, a combustor section 11, and a turbine section 12. A person of ordinary skill in the art should appreciate that there are a multitude of ways in which the gas turbine engine components may be linked together. For instance, the engine may include a fan stage, a nozzle and/or additional compressors and turbine stages may be added with intercoolers connecting between the compressor stages. The present inventions are contemplated as being applicable with virtually all types and configurations of gas turbine engines.

The gas turbine engines contemplated herein are applicable for use in aircraft, as industrial power plants, and as propulsion systems in vehicles and vessels. Industrial power plant applications include, for example, pumping sets for gas and oil transmission lines and electricity generation systems. The term "aircraft" is generic and includes helicopters, airplanes, missiles, unmanned space devices, transatmospheric vehicles and other substantially similar devices.

Compressor section 10 includes at least one rotor 15 having a plurality of compressor blades coupled thereto. A rotatable shaft 16 is located within a mechanical housing/case 17 of the compressor section 10 and is coupled to the rotor 15. The rotor 15 and the shaft 16 may also be integrated together into a unitary component. The rotatable shaft 16 and the rotor 15 are supported by a plurality of bearings. Rotation of the shaft 16 with the attached rotor 15 causes the plurality of compressor blades to pressurize the working fluid passing through the compressor section 10. In one form the working fluid is air and the compressor section 10 includes a multi-stage axial flow compressor. However, other types of compressors are contemplated herein. The turbine section 12 may also include a rotatable shaft with a plurality of blades for extracting energy from the hot exhaust flow passing from the combustor.

Figure 2:
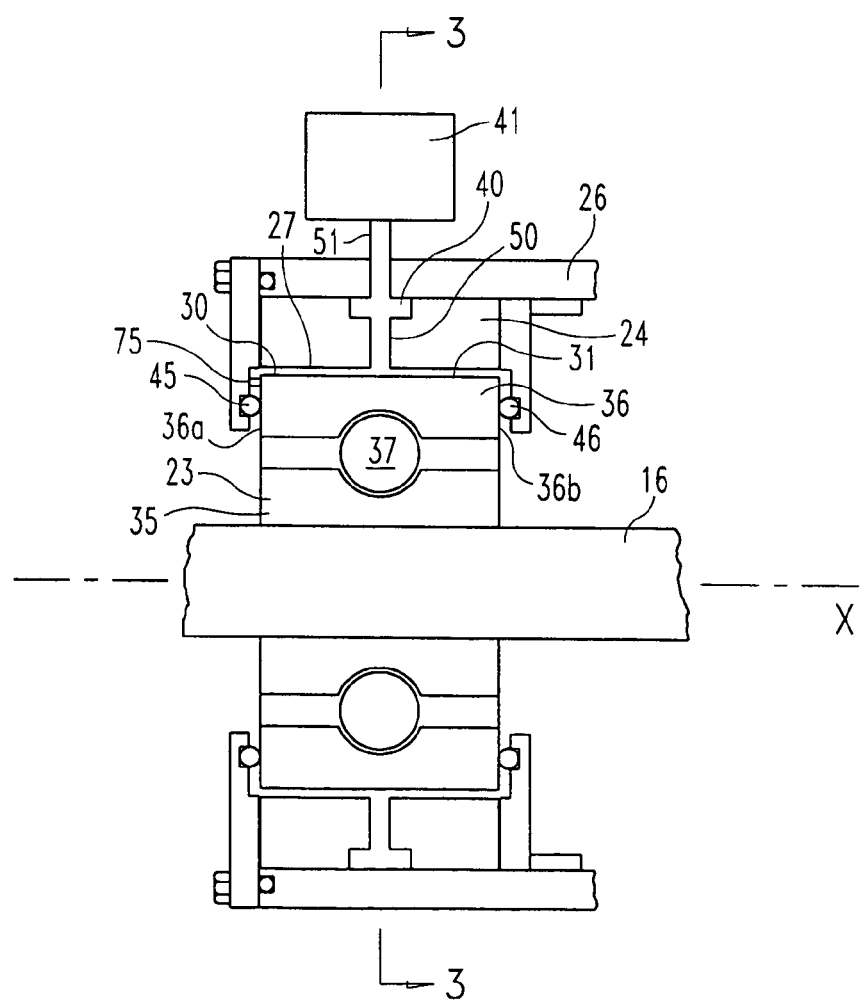
FIG. 2 is a sectional view illustrating one embodiment of mounting a rotatable shaft within the gas turbine engine.
Figure 3:
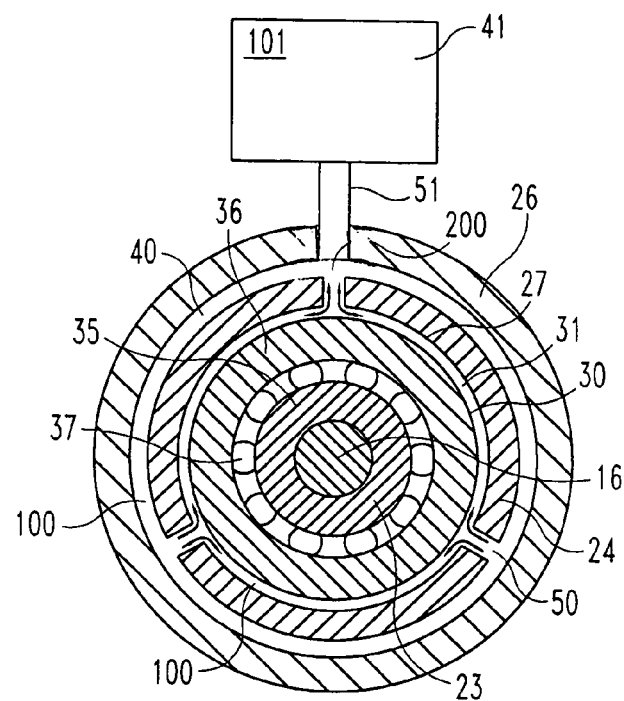
FIG. 3 is an illustrative sectional view taken through lines 3-3 of FIG. 2.

With reference to FIGS. 2 and 3, there is illustrated one embodiment of the rotatable shaft 16 mounted within a gas turbine engine component. While the present inventions will be described with reference to application within the compressor section 10, it is also contemplated that the present inventions may have application in the turbine section 12. The shaft 16 normally rotates about a centerline of rotation X. However, an imbalance acting on the rotor 15 (FIG. 1) may cause the shaft 16 to undergo an eccentric or orbiting motion and/or a radial displacement that deviates the position of shaft 16 from the centerline of rotation X. There is no intention herein to require that the deviation of the position of shaft 16 from the centerline of rotation X must be caused by an imbalance acting on the rotor 15 unless specifically provided to the contrary. The present inventions seek to dampen the undesirable motion of the shaft 16 at critical speeds with squeeze film damping. The principles of squeeze film damping are believed known to one of ordinary skill in the art and therefore details regarding how the damping liquid acts to damp the undesirable motion of the shaft 16 will not be described herein.

The shaft 16 is coupled to a bearing 23 that is located within a body/housing 24. Shaft 16 rotates within the bearing 23 relative to the body/housing 24. The bearing 23 may be a rolling element type bearing; that may include ball or roller elements 37. In one form the bearing 23 is a rolling element bearing including an inner bearing race 35, an outer bearing race 36 and a plurality of rolling elements 37 disposed therebetween. However, other types of bearings are contemplated herein including, but not limited to journal and air bearings.

The body/housing 24 may be formed with a mechanical structure/bearing housing 26 or the mechanical structure/bearing housing 26 may be a separate component that the body/housing 24 is connected to thereto. Further, the present invention also contemplates that the mechanical structure/bearing housing 26 may be a part of the mechanical housing/case 17. In any of these forms the body/housing 24 is held stationary relative to the rotatable shaft 16.

The body/housing 24 is disposed around the bearing 23 and shaft 16. In one form the body/housing 24 has a circular inner surface 27 that is spaced from the outer surface 30 of the bearing 23. The circular inner surface 27 may define a uniform or non uniform surface in terms of parameters such as, but not limited to flatness and/or geometry. In one form the circular inner surface 27 is a substantially uniformly shaped surface extending around and spaced form the outer surface 30 of the bearing 23. Even though a surface may be called uniform it is contemplated herein that it may also include one or more fluid flow holes or passages therethrough.

The bearing 23 is coupled to the mechanical structure/bearing housing 26. In one form the bearing 23 with the rotatable shaft 16 is moveable in a radial direction relative to the circular inner surface 27. The movement is generally caused by forces acting upon components, such as rotor 15 that is attached to the shaft 16 and the forces are transmitted through the shaft 16 to the bearing 23. While the shaft 16 rotates on the bearing 23 relative to the mechanical structure/bearing housing 26 the bearing 23 is fixed so that it does not rotate relative to the mechanical structure/bearing housing 26. More specifically, in one form the outer race 36 of the bearing 23 may be pinned or keyed with the mechanical structure/bearing housing 26 to couple the components together and restrain the bearing 23 from rotation while allowing the shaft 16 to rotate within the bearing 23. In one form, the outer race 36 is free to whirl but does not rotate and the damping forces associated with the fluid squeezing oppose the outer race 36 whirling. Feature number 75 has been utilized herein to indicate one or more of pins or keys for coupling the bearing 23 with the mechanical structure/bearing housing 26. In one form the pin or key 75 is fixedly connected to the outer race 36 of the bearing and a groove or slot is formed in the mechanical structure/bearing housing 26. As the shaft 16 and the bearing 23 are moved in a radial direction the pin 75 moves in the groove or slot therewith to allow radial movement while preventing rotational movement of the outer race 36.

The outer circumferential surface 30 of the bearing 23 is spaced from the circular inner surface 27 of the housing/body 24. Defined between the outer circumferential surface 30 and the circular inner surface 27 is an annular space/volume 31. In one form the annular space 31 has a thickness in the radial direction within a range of about 0.005 to about 0.015 inches and more particularly about 0.008 to about 0.010 inches. However, the present application contemplates that the annular space 31 may have other thickness in the radial direction. The annular space 31 extends around the outer circumferential surface 30 of the bearing 23. The annular space 31 may be of a uniform or non-uniform configuration and may change shape and/or size as the bearing 23 and rotatable shaft 16 is moved relative to the inner surface 27.

Referring to FIG. 3, there is depicted an illustrative sectional view taken along lines 3-3 of FIG. 2 with the shaft 16 mounted to the mechanical structure/bearing housing 26. In one form a closed fluid flow passageway/system 200 includes the annular space 31, a fluid flow passageway 40 and a reservoir 41. The passageway/system 200 defines a closed fluid damping system including a damping liquid and a pressurized gas. A pair of seals 45 and 46 (FIG. 2) are located between the mechanical structure/bearing housing 26 and the ends 36a and 36b of the outer race 36 to prevent fluid leakage from annular space 31.

In one form the fluid flow passageway 40 is a circumferential passage that is formed in the body/housing 24 and extends around the bearing 23. A plurality of fluid flow transfer passageways 50 are disposed between the fluid flow passageway 40 and the annular space 31. In another form there is only one fluid flow transfer passageway 50 disposed between the fluid flow passageway 40 and the annular space 31. Reservoir 41 is in fluid flow communication with the rest of the passageway/system 200 through a fluid feed passageway 51. The passageway/system 200 is a closed, self-contained system that provides the damping liquid in annular space 31 to damp the bearing 23 and shaft 16 by squeeze film damping. The annular space 31, fluid flow passageway 40, reservoir 41, fluid feed passageway 51 and the plurality of fluid flow transfer passageways 50 are in fluid flow communication with one another.

The passageway/system 200 has disposed therein a damping liquid 100 and a pressurized gas 101. The damping liquid 100 may be a lubricant, such as but not limited to an oil. Additionally, the present application also contemplates the utilization of a high temperature damping liquid that can be utilized in environments with temperatures up to about 900° F.; one example of a high temperature damping liquid is a high temperature oil distributed by Santovac of St. Charles Mo. under the trade name OS-124. The pressurized gas 101 may be an inert gas and/or compressor bleed and/or combinations thereof, and preferably has a pressure within a range of about thirty to fifty psig. However, other gas pressures are contemplated herein. Further, the damping liquid 100 may be a mixture of multiple liquids and the pressurized gas 101 may be a mixture of multiple gases. The damping liquid 100 fills a substantial portion of the passageway/system 200 including at least the annular space 31. The pressurized gas 101 within the passageway/system 200 acts on the damping liquid 100 and is preferably not entrained with the damping liquid 100. More specifically, in one form a portion of the passageway/system 200 is filled with the damping liquid 100 and another portion of the passageway/system 200 is filled with the pressurized gas 101.

In one form of the present invention the annular space 31, the plurality of fluid flow passageways 50 and the fluid flow passageway 40 are filled with the damping liquid 100. The system/passageway 200 also includes the reservoir 41 and fluid feed passageway 51 that contain the pressurized gas 101. As the bearing 23 and shaft 16 are radially displaced the damping liquid 100 is free to flow within the annular space 31 and between the annular space 31 and the connecting fluid flow passageways to provide the quantity of damping liquid needed to locations within the annular space 31.

The present application contemplates alternative embodiments wherein the fluid flow passageway 40 may have other configurations and may also not be located within the body 24. In one alternative embodiment the reservoir 41 and the fluid flow passageway 40 are combined. The reservoir 41 may also be located at the ends of the damper film within the annular space 31. Further, the damper film located within the annular space 31 may be formed of two radially spaced damper films separated by a floating damper ring. The floating damper ring is prevented from rotation.

Figure 6:
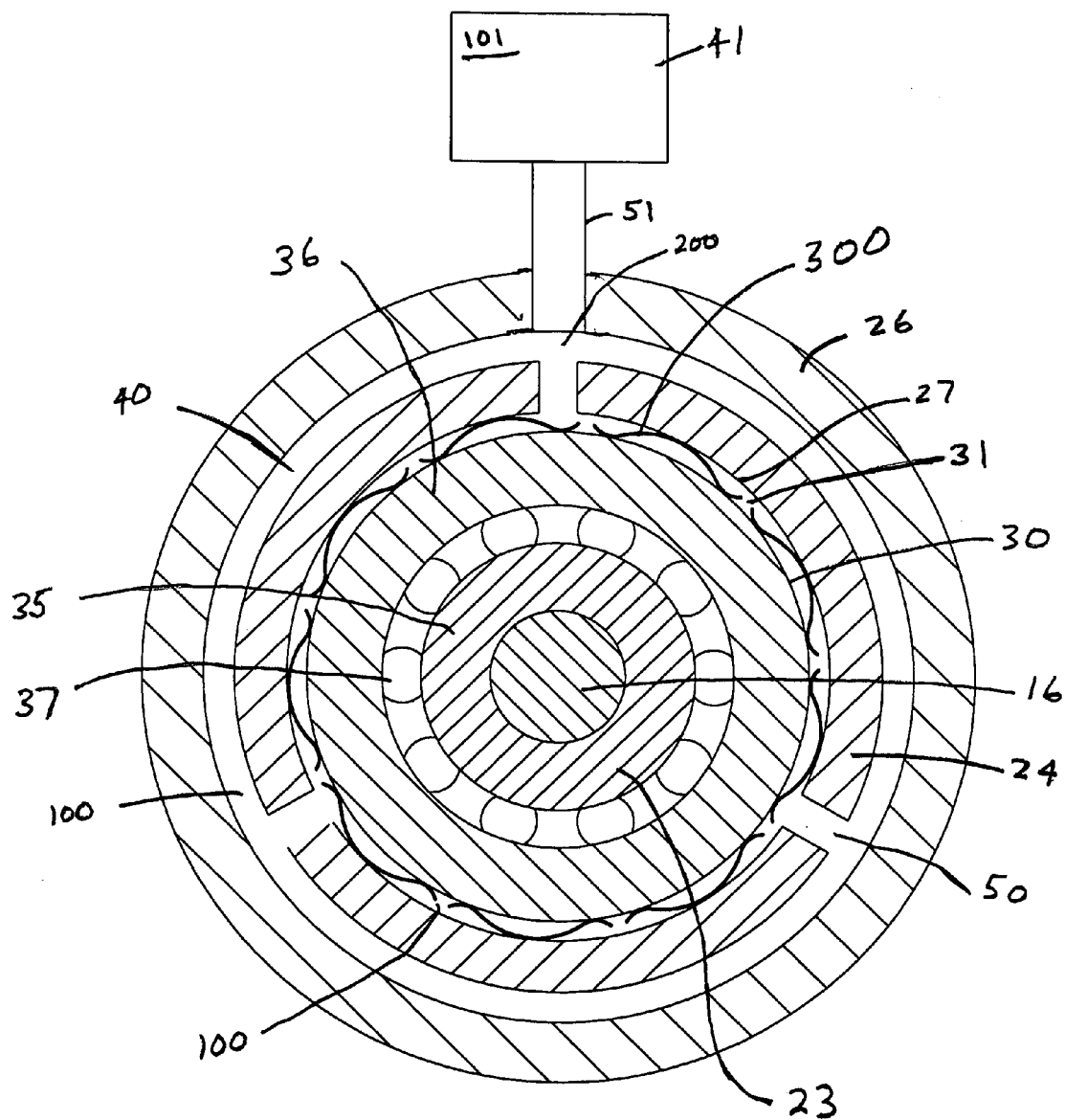
FIG. 6 is an illustrative sectional view of another embodiment of mounting a rotatable shaft within the gas turbine engine.

With reference to FIG. 6, there is illustrated an alternative embodiment of the system of FIG. 3. The system set forth in FIG. 6, is substantially similar to the system associated with FIG. 3 and like feature numbers are used to describe like features. The system set forth in FIG. 6, includes a plurality of bearing support springs 300 disposed within the annular space 31. The bearing support springs 300 are positioned between the body/housing 24 and the outer race 36. In one aspect the plurality of bearing support springs 300 functions to prelocate the bearing 23. In another form of the present invention a single spring extends around the bearing 23 and is utilized to prelocate the bearing 23.

Figure 4:
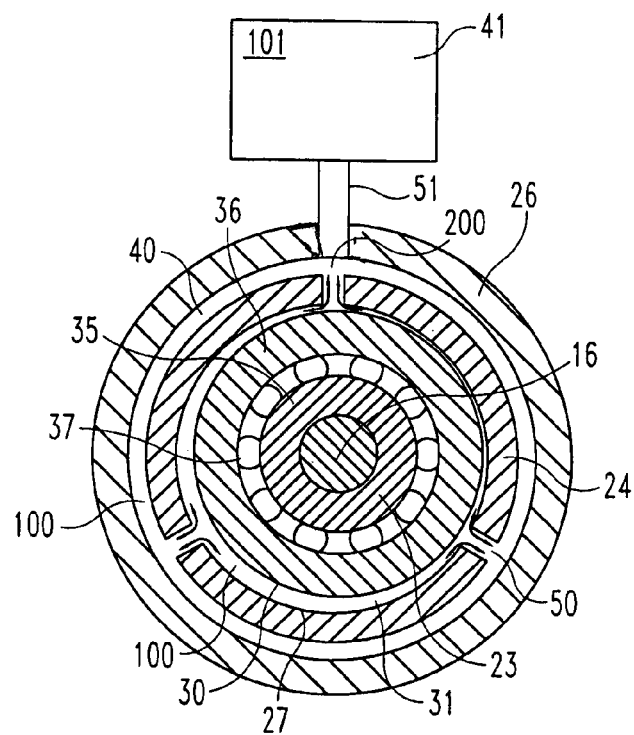
FIG. 4 is an illustrative sectional view taken through lines 3-3 wherein the rotatable shaft has been displaced from the centerline of rotation.

A brief description of the operation of the damping systems of the present inventions will now be set forth with reference to FIGS. 3 and 4. The passageway/system 200 is a closed fluid tight system containing a predetermined quantity of damping liquid 100 and a predetermined quantity of pressurized gas 101. Upon the shaft 16 and bearing 23 being displaced in a radial direction (FIG. 4) the damping liquid 100 located within the annular space 31 flows as required to compensate for the movement of the bearing 23 and shaft 16. The thickness of a portion of the layer of damping liquid 100 will change as the shaft 16 moves from the position in FIG. 3 to the position in FIG. 4. There will also be a change in pressure on the damping liquid 100 as a result of the movement of the shaft 16 and bearing 23. The damping liquid 100 within the annular space 31 functions as part of the fluid damping system to damp the shaft 16 through squeeze film damping.

Figure 5:
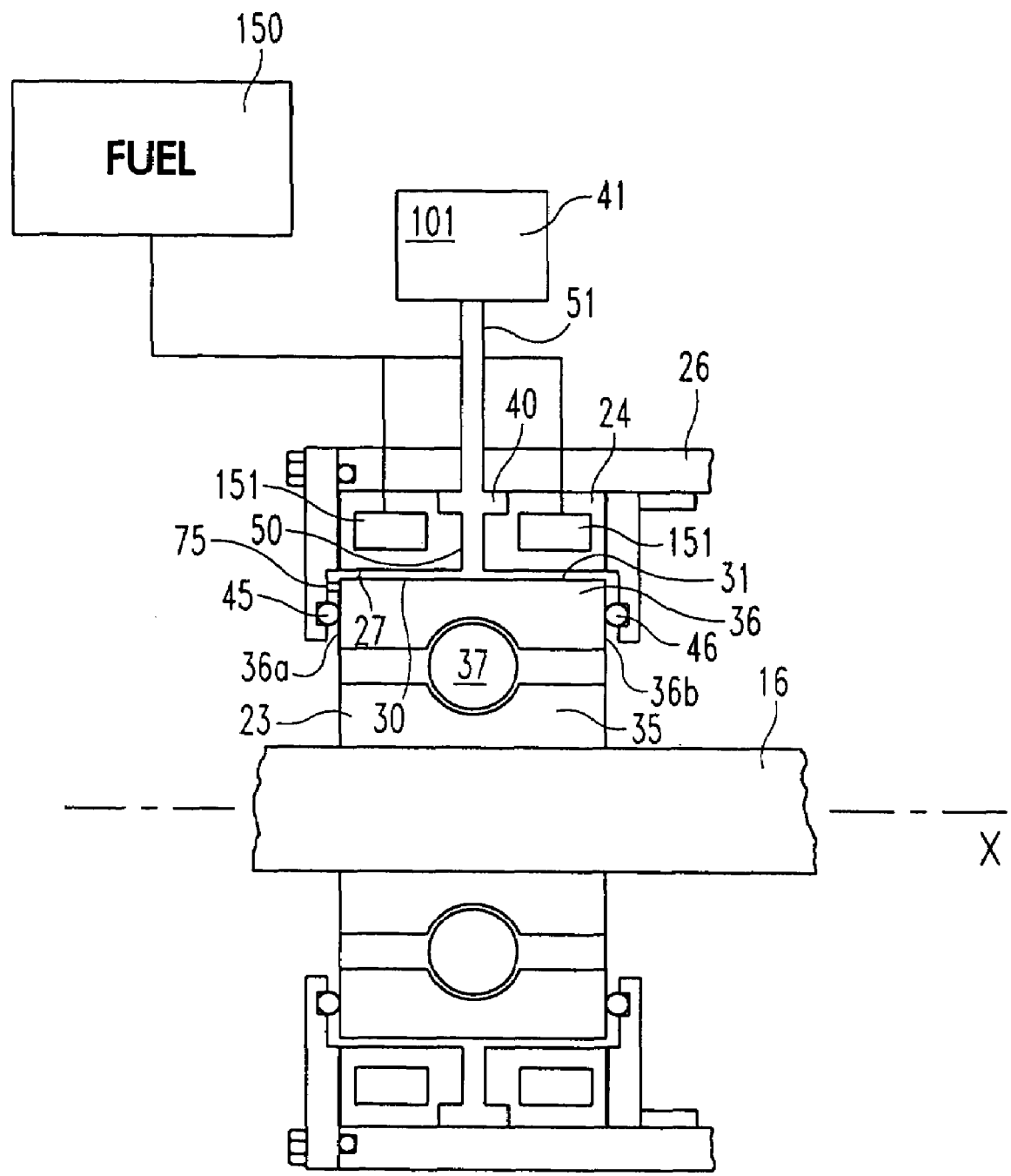
FIG. 5 is a sectional view illustrating another embodiment of mounting a rotatable shaft within the gas turbine engine.

With reference to FIG. 5, there is illustrated another embodiment of mounting the rotatable shaft 16 within the gas turbine engine 9. The embodiment depicted in FIG. 5 is substantially identical to the embodiment of FIG. 2 and like feature numbers will be used to represent like features. However, the embodiment depicted in FIG. 5 includes a fuel source 150 that is disposed in fluid flow communication with the body/housing 24. Fuel from the fuel source 150 may be utilized to cool the damping liquid utilized in the fluid damping system. Formed within the body/housing 24 is at least one fluid flow passageway 151 for the circulation of the fuel through the body/housing 24. In one form the body/housing 24 includes a plurality of fluid flow passageways 151 formed within the body/housing 24. The fluid flow passageway 151 extends around the body/housing 24, and in one form is defined by a ring shape. In one form the body/housing 24 is formed of a conductive material so that the passage of the fuel through fluid flow passageway 151 is disposed in a conductive heat transfer relationship with the damping liquid 100 passing through the fluid flow passageway 40 and/or the fluid flow transfer passageways 50 and/or the annular space 31. The fuel may be utilized as a cooling source to extract energy from the damping liquid 100. In one form of the present invention the cooling of the damping liquid 100 allows the application of the damping technology in environments having a temperature up to about 1000° F.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
   a housing having an inner surface;
   a bearing located inside said housing;
   a rotatable shaft having at least a portion located within said housing and coupled with said bearing; and
   a self contained damping system including a damping liquid and a pressurized gas therein, said damping system having a first portion disposed between said bearing and said inner surface and filled with at least a portion of the damping liquid to damp said shaft through squeeze film damping.

2. The apparatus of claim 1, wherein said damping system including a second portion spaced from and in fluid flow communication with said first portion; and
   wherein said damping liquid flows between said first portion and said second portion.

3. The apparatus of claim 2, wherein said second portion is a passageway formed in and extending around said housing; and
   further including a plurality of damping liquid transfer passages located between said first portion and said second portion for the passage of the damping liquid.

4. The apparatus of claim 1, wherein said damping system including a reservoir in fluid flow communication with said first portion;
    wherein said pressurized gas is located within at least said reservoir and acts on said damping liquid; and
    wherein said damping liquid flows into and out of said first portion.

5. The apparatus of claim 1, wherein said pressurized gas is not entrained in said damping liquid.

6. The apparatus of claim 1, wherein said housing is located within a mechanical case;
    wherein said housing having a ring shape and including a fluid flow passageway formed around the ring shape, said fluid flow passageway forming a part of said damping system and disposed in fluid flow communication with said first portion; and
    wherein said damping system including a reservoir in fluid communication with said fluid flow passageway and including at least a portion of said pressurized gas.

7. The apparatus of claim 1, wherein said damping system is disposed in a heat transfer relationship with another fluid to cool said damping liquid.

8. The apparatus of claim 1, which further includes a fuel system including a fuel;
    wherein said damping system is disposed in a heat transfer relationship with said fuel in order to cool said damping liquid.

9. The apparatus of claim 3, which further includes a fuel system including a fuel;
    wherein said housing including a second passageway formed therein for the passage of at least a portion of the fuel; and
    wherein said passageway is disposed in a heat transfer relationship with said second passageway to cool the damping liquid therein.

10. An apparatus comprising:
    a body having an inner surface;
    a rotatable shaft;
    a bearing coupled with said shaft and located within said body, said bearing having an outer surface spaced from said inner surface to define an annular space therebetween; and
    a reservoir in fluid communication with said annular space, said reservoir and said annular space forming at least a portion of a closed squeeze film damping system including a damping liquid and a pressurized gas, wherein at least a portion of said damping liquid is located within said annular space to damp said shaft.

11. The apparatus of claim 10, wherein said damping liquid is a liquid operable up to about 900° F.

12. The apparatus of claim 10, wherein said closed squeeze film damping system including a fluid flow passageway defined in said body and extending around said annular space, said fluid flow passageway in fluid flow communication with said annular space and said reservoir.

13. The apparatus of claim 12, wherein said pressurized gas is located within at least said reservoir and acts on said damping liquid; and
    wherein said damping liquid flows into and out of said annular space.

14. The apparatus of claim 10, wherein said bearing is a rolling element bearing.

15. The apparatus of claim 10, which further includes means for cooling said damping liquid.

* * * * *